(12) United States Patent
Zebiak

(10) Patent No.: US 12,091,010 B1
(45) Date of Patent: Sep. 17, 2024

(54) NOISE-DEPENDENT PROPULSION SYSTEM CONTROL

(71) Applicant: GM Global Technology Operations LLC, Detroit, MI (US)

(72) Inventor: Matthew S. Zebiak, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/306,413

(22) Filed: Apr. 25, 2023

(51) Int. Cl.
| | |
|---|---|
| *G06G 7/70* | (2006.01) |
| *B60W 30/18* | (2012.01) |
| *B60W 40/12* | (2012.01) |
| *B60W 50/04* | (2006.01) |
| B60W 50/00 | (2006.01) |
| H04R 29/00 | (2006.01) |

(52) U.S. Cl.
CPC ...... *B60W 30/18009* (2013.01); *B60W 40/12* (2013.01); *B60W 50/04* (2013.01); *B60W 2050/0083* (2013.01); *B60W 2720/00* (2013.01); *H04R 29/004* (2013.01)

(58) Field of Classification Search
CPC ..... G10K 2210/1282; G10K 11/17883; G10K 11/17823; B60W 10/06; B60W 10/08

USPC .......................................................... 701/101
See application file for complete search history.

(56) References Cited

U.S. PATENT DOCUMENTS

| | | | | |
|---|---|---|---|---|
| 2009/0158849 | A1* | 6/2009 | Gregg ................ | H04R 29/00 73/584 |
| 2014/0236405 | A1* | 8/2014 | Wakashiro .............. | B60L 50/10 903/903 |
| 2020/0070829 | A1* | 3/2020 | Martinez ............... | B60W 30/20 |
| 2021/0304728 | A1* | 9/2021 | Wang ............... | G10K 11/17823 |
| 2021/0352424 | A1* | 11/2021 | VanKeulen ......... | G06F 11/2733 |

* cited by examiner

*Primary Examiner* — Long T Tran
*Assistant Examiner* — James J Kim
(74) *Attorney, Agent, or Firm* — Vivacqua Crane, PLLC

(57) ABSTRACT

A propulsion control system for a vehicle includes a first vehicle sensor, a second vehicle sensor, and a controller in electrical communication with the first vehicle sensor and the second vehicle sensor. The controller is programmed to determine a closed-loop noise level in a cabin of the vehicle using the first vehicle sensor. The controller is further programmed to determine an open-loop noise level in the cabin of the vehicle using the second vehicle sensor. The controller is further programmed to adjust a propulsion calibration value of the vehicle based at least in part on the closed-loop noise level and the open-loop noise level.

18 Claims, 3 Drawing Sheets

NOISE-DEPENDENT PROPULSION SYSTEM CONTROL

INTRODUCTION

The present disclosure relates to systems and methods for propulsion control for a vehicle.

To increase occupant comfort and convenience, vehicle control systems may be configured to operate the vehicle propulsion system such that mechanical and/or electrical noise produced by the vehicle propulsion system is reduced. For example, ignition spark tables for an internal combustion engine may be adjusted such that combustion occurs smoothly, reducing impulses which may increase ambient noise in the vehicle cabin. In another example, vehicle control systems may be configured to prevent operation of an electric motor in certain speed ranges which may cause harmonic vibration which increases ambient noise in the vehicle cabin. However, vehicle propulsion system operation modes which reduce mechanical and/or electrical noise may not be optimized in order to maximize fuel/energy efficiency. Additionally, vehicle propulsion system operation modes which reduce mechanical and/or electrical noise may not be optimized in order to achieve maximum performance.

Thus, while current vehicle propulsion control systems and methods achieve their intended purpose, there is a need for a new and improved system and method for propulsion control for a vehicle.

SUMMARY

According to several aspects, a propulsion control system for a vehicle is provided. The propulsion control system includes a first vehicle sensor, a second vehicle sensor, and a controller in electrical communication with the first vehicle sensor and the second vehicle sensor. The controller is programmed to determine a closed-loop noise level in a cabin of the vehicle using the first vehicle sensor. The controller is further programmed to determine an open-loop noise level in the cabin of the vehicle using the second vehicle sensor. The controller is further programmed to adjust a propulsion calibration value of the vehicle based at least in part on the closed-loop noise level and the open-loop noise level.

In another aspect of the present disclosure, to determine the closed-loop noise level, the controller is further programmed to measure the closed-loop noise level using the first vehicle sensor. The first vehicle sensor is an audio microphone disposed within the cabin of the vehicle.

In another aspect of the present disclosure, to determine the closed-loop noise level, the controller is further programmed to perform a diagnostic check on the audio microphone prior to measuring the closed-loop noise level.

In another aspect of the present disclosure, to perform the diagnostic check on the audio microphone, the controller is further programmed to play a predetermined sound using a loudspeaker, record a received sound using the audio microphone, and compare the received sound to the predetermined sound.

In another aspect of the present disclosure, to determine the open-loop noise level, the controller is further programmed to determine a vehicle speed using the second vehicle sensor. The second vehicle sensor is a vehicle speed sensor. To determine the open-loop noise level, the controller is further programmed to determine a vehicle audio volume level. To determine the open-loop noise level, the controller is further programmed to determine the open-loop noise level based at least in part on the vehicle speed and the vehicle audio volume level.

In another aspect of the present disclosure, to determine the open-loop noise level based at least in part on the vehicle speed and the vehicle audio volume level, the controller is further programmed to determine an estimated road and wind noise level based at least in part on the vehicle speed. The estimated road and wind noise level is determined based at least in part on at least one known road and wind noise level measured at a known speed. To determine the open-loop noise level based at least in part on the vehicle speed and the vehicle audio volume level, the controller is further programmed to determine the open-loop noise level to be a combination of the vehicle audio volume level and the estimated road and wind noise level.

In another aspect of the present disclosure, to adjust the propulsion calibration value of the vehicle, the controller is further programmed to determine a deviation between the closed-loop noise level and the open-loop noise level. To adjust the propulsion calibration value of the vehicle, the controller is further programmed to compare the deviation to a predetermined deviation threshold. To adjust the propulsion calibration value of the vehicle, the controller is further programmed to adjust the propulsion calibration value of the vehicle based on the closed-loop noise level in response to determining that the deviation is less than or equal to the predetermined deviation threshold.

In another aspect of the present disclosure, to adjust the propulsion calibration value of the vehicle based on the closed-loop noise level, the controller is further programmed to compare the closed-loop noise level to a predetermined noise level of each of a plurality of operational profiles of the propulsion calibration value. To adjust the propulsion calibration value of the vehicle based on the closed-loop noise level, the controller is further programmed to apply one of the plurality of operational profiles of the propulsion calibration value having the predetermined noise level closest to the closed-loop noise level.

In another aspect of the present disclosure, to adjust the propulsion calibration value of the vehicle based on the closed-loop noise level, the controller is further programmed to identify a first of the plurality of operational profiles of the propulsion calibration value having the predetermined noise level less than the closed-loop noise level. To adjust the propulsion calibration value of the vehicle based on the closed-loop noise level, the controller is further programmed to identify a second of the plurality of operational profiles of the propulsion calibration value having the predetermined noise level greater than the closed-loop noise level. To adjust the propulsion calibration value of the vehicle based on the closed-loop noise level, the controller is further programmed to generate a selected operational profile by interpolating between the first of the plurality of operational profiles of the propulsion calibration value and the second of the plurality of operational profiles of the propulsion calibration value based on the closed-loop noise level. To adjust the propulsion calibration value of the vehicle based on the closed-loop noise level, the controller is further programmed to apply the selected operational profile.

In another aspect of the present disclosure, the propulsion calibration value includes at least one of an inverter switching frequency, an inverter enablement state, and a motor no-fly zone.

According to several aspects, a method for propulsion control for a vehicle is provided. The method includes determining a closed-loop noise level in a cabin of the vehicle using a first vehicle sensor. The method also includes determining an open-loop noise level in the cabin of the vehicle using a second vehicle sensor. The method also includes adjusting a propulsion calibration value of the vehicle based at least in part on the closed-loop noise level and the open-loop noise level.

In another aspect of the present disclosure, determining the closed-loop noise level further may include measuring the closed-loop noise level using the first vehicle sensor. The first vehicle sensor is an audio microphone disposed within the cabin of the vehicle.

In another aspect of the present disclosure, determining the open-loop noise level further may include determining a vehicle speed using the second vehicle sensor. The second vehicle sensor is a vehicle speed sensor. Determining the open-loop noise level further may include determining a vehicle audio volume level. Determining the open-loop noise level further may include determining the open-loop noise level based at least in part on the vehicle speed and the vehicle audio volume level.

In another aspect of the present disclosure, determining the open-loop noise level based at least in part on the vehicle speed and the vehicle audio volume level further may include determining an estimated road and wind noise level based at least in part on the vehicle speed. The estimated road and wind noise level is determined based at least in part on at least one known road and wind noise level measured at a known speed. Determining the open-loop noise level based at least in part on the vehicle speed and the vehicle audio volume level further may include determining the open-loop noise level to be a combination of the vehicle audio volume level and the estimated road and wind noise level.

In another aspect of the present disclosure, adjusting the propulsion calibration value of the vehicle further may include determining a deviation between the closed-loop noise level and the open-loop noise level. Adjusting the propulsion calibration value of the vehicle further may include comparing the deviation to a predetermined deviation threshold. Adjusting the propulsion calibration value of the vehicle further may include adjusting the propulsion calibration value of the vehicle based on the closed-loop noise level in response to determining that the deviation is less than or equal to the predetermined deviation threshold.

In another aspect of the present disclosure, adjusting the propulsion calibration value of the vehicle based on the closed-loop noise level further may include comparing the closed-loop noise level to a predetermined noise level of each of a plurality of operational profiles of the propulsion calibration value. Adjusting the propulsion calibration value of the vehicle based on the closed-loop noise level further may include applying one of the plurality of operational profiles of the propulsion calibration value having the predetermined noise level closest to the closed-loop noise level.

In another aspect of the present disclosure, adjusting the propulsion calibration value of the vehicle based on the closed-loop noise level further may include identifying a first of the plurality of operational profiles of the propulsion calibration value having the predetermined noise level less than the closed-loop noise level. Adjusting the propulsion calibration value of the vehicle based on the closed-loop noise level further may include identifying a second of the plurality of operational profiles of the propulsion calibration value having the predetermined noise level greater than the closed-loop noise level. Adjusting the propulsion calibration value of the vehicle based on the closed-loop noise level further may include generating a selected operational profile by interpolating between the first of the plurality of operational profiles of the propulsion calibration value and the second of the plurality of operational profiles of the propulsion calibration value based on the closed-loop noise level. Adjusting the propulsion calibration value of the vehicle based on the closed-loop noise level further may include applying the selected operational profile.

According to several aspects, a propulsion control system for a vehicle is provided. The propulsion control system includes an audio microphone, a vehicle speed sensor, and a controller in electrical communication with the audio microphone and the vehicle speed sensor. The controller is programmed to perform a diagnostic check on the audio microphone. The controller is further programmed to measure a closed-loop noise level using the audio microphone. The controller is further programmed to determine a vehicle speed using the vehicle speed sensor. The controller is further programmed to determine a vehicle audio volume level. The controller is further programmed to determine an open-loop noise level based at least in part on the vehicle speed and the vehicle audio volume level. The controller is further programmed to determine a deviation between the closed-loop noise level and the open-loop noise level. The controller is further programmed to compare the deviation to a predetermined deviation threshold. The controller is further programmed to adjust a propulsion calibration value of the vehicle based on the closed-loop noise level in response to determining that the deviation is less than or equal to the predetermined deviation threshold.

In another aspect of the present disclosure, to determine the open-loop noise level based at least in part on the vehicle speed and the vehicle audio volume level, the controller is further programmed to determine an estimated road and wind noise level based at least in part on the vehicle speed. The estimated road and wind noise level is determined based at least in part on at least one known road and wind noise level measured at a known speed. To determine the open-loop noise level based at least in part on the vehicle speed and the vehicle audio volume level, the controller is further programmed to determine the open-loop noise level to be a combination of the vehicle audio volume level and the estimated road and wind noise level.

In another aspect of the present disclosure, to adjust the propulsion calibration value of the vehicle based on the closed-loop noise level, the controller is further programmed to compare the closed-loop noise level to a predetermined noise level of each of a plurality of operational profiles of the propulsion calibration value. To adjust the propulsion calibration value of the vehicle based on the closed-loop noise level, the controller is further programmed to apply one of the plurality of operational profiles of the propulsion calibration value having the predetermined noise level closest to the closed-loop noise level.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In many cases, it may be advantageous to operate a vehicle propulsion control system such that cabin noise in the vehicle is minimized to increase occupant comfort. However, noise-reducing operation modes may not offer maximum efficiency and/or performance. In some cases, external factors, such as, for example, road and/or wind noise, vehicle radio/infotainment audio volume, and/or the like may increase cabin noise such that the occupant may not be disturbed by a marginal additional increase in cabin noise due to the vehicle propulsion system. Therefore, the present disclosure provides a new and improved system and method for propulsion control for a vehicle which may detect increased cabin noise conditions and adjust vehicle propulsion system operating points to achieve increased efficiency and/or performance with minimal impact to occupant comfort.

Figure 1:
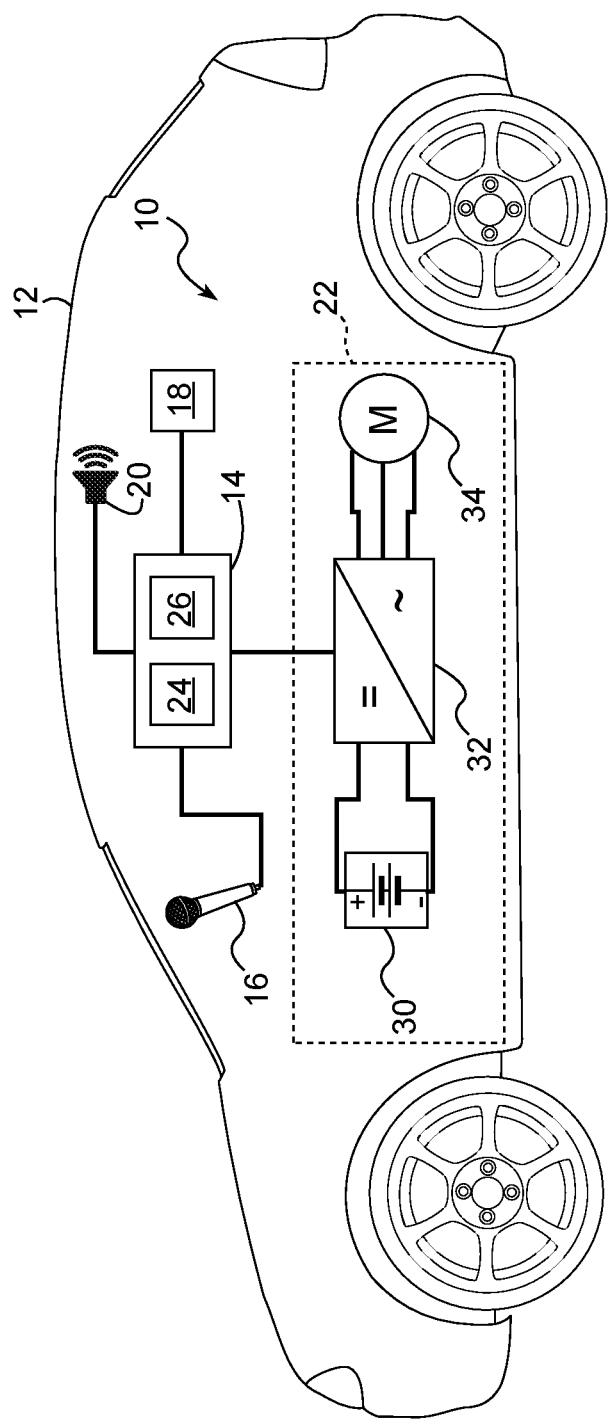
FIG. 1 is a schematic diagram of a propulsion control system for a vehicle, according to an exemplary embodiment.

Referring to FIG. 1, a propulsion control system for a vehicle system is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, an audio microphone 16, a vehicle speed sensor 18, a loudspeaker 20, and a vehicle propulsion system 22.

The controller 14 is used to implement a method 100 for propulsion control for a vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 26 may include volatile and nonvolatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the audio microphone 16, the vehicle speed sensor 18, the loudspeaker 20, and the vehicle propulsion system 22. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The audio microphone 16 is used to measure ambient noise (e.g., road noise produced by interaction of tires of the vehicle 12 with the roadway surface, wind noise produced by interaction of exterior surfaces of the vehicle 12 with air, and/or the like) in a cabin of the vehicle 12. In an exemplary embodiment, the audio microphone 16 includes a unidirectional dynamic microphone (i.e., a microphone which converts acoustic waves to electrical signals using electromagnetic induction) configured to receive sound from a specific area of the vehicle 12. In another exemplary embodiment, the audio microphone 16 includes a plurality of microelectromechanical systems (MEMS) microphones (e.g., a microphone having a pressure-sensitive diaphragm etched directly into a silicon wafer) disposed throughout the cabin of the vehicle 12 configured to receive sound. It should be understood that additional types of microphones which are configured to convert acoustic waves to electrical signals (e.g., digital and/or analog electrical signals) are included in the scope of the present disclosure. The audio microphone 16 is in electrical communication with the controller 14 as discussed above.

The vehicle speed sensor 18 is used to measure a speed of the vehicle 12. In an exemplary embodiment, the vehicle speed sensor 18 includes a toothed ferromagnetic ring or disk (also known as a reluctor or tone ring) mechanically linked to a wheel of the vehicle 12 such that the toothed ferromagnetic ring rotates at a same speed as the wheel of the vehicle 12. The vehicle speed sensor 18 further includes a sensor (e.g., a coil of wire) which is affixed near the toothed ferromagnetic ring and is stationary relative to the toothed ferromagnetic ring such that the sensor experiences an induced alternating voltage due to the changing magnetic field caused by the rotation of the toothed ferromagnetic ring. In a non-limiting example, the induced alternating voltage is sinusoidal, and a magnitude and/or frequency of the induced alternating voltage is proportional to a rotational speed of the toothed ferromagnetic ring and thus the vehicle speed. In an exemplary embodiment, the induced alternating voltage is transmitted directly to the controller 14 for further processing, for example, using an analog-to-digital converter of the controller 14. In another exemplary embodiment, the vehicle speed sensor 18 further includes signal conditioning circuitry which processes the induced alternating voltage before transmission to the controller 14 (e.g., amplifying the induced alternating voltage, digitizing the induced alternating voltage, encoding the vehicle speed value into a communication protocol, and/or the like). It should be understood that various additional devices and methods for determining vehicle speed, such as, for example, global navigation satellite systems (e.g., GPS), sensors measuring other drivetrain components (e.g., transmission speed sensor, electric motor speed sensor, and/or the like), and/or the like are within the scope of the present disclosure. The vehicle speed sensor 18 is in electrical communication with the controller 14 as discussed above.

The loudspeaker 20 is used to produce sound for entertainment, audible feedback, and/or diagnostics by converting electrical signals to acoustic waves. In an exemplary embodiment, the loudspeaker 20 includes a permanent magnet, a circular coil of wire, and a diaphragm. The circular coil of wire is affixed to the diaphragm and the permanent magnet is disposed along the axis of the circular coil of wire. Electrical currents from an audio signal passing through the circular coil of wire induce electromotive forces which move the diaphragm. The movement of the diaphragm produces acoustic waves in the air surrounding the diaphragm. The loudspeaker 20 is in electrical communication with the controller 14 as described above.

The vehicle propulsion system 22 is used to provide torque to wheels of the vehicle 12 such that the vehicle 12 is propelled along a roadway. In an exemplary embodiment, the vehicle propulsion system 22 is an electric vehicle propulsion system including a traction battery 30, an inverter 32, and an electric motor 34. In the present disclosure, the vehicle propulsion system 22 is described in reference to an exemplary electric vehicle propulsion system. However, it should be understood that the systems and methods of the present disclosure are also applicable to internal combustion vehicle propulsion systems. In a non-limiting example, an internal combustion vehicle propulsion system may include a fuel system (not shown), an internal combustion engine (not shown), and a transmission (not shown).

The traction battery 30 stores and provides electrical energy in the form of direct current (DC) for propulsion of the vehicle 12. In an exemplary embodiment, the traction battery 30 includes a plurality of battery cells (e.g., lithium-ion battery cells) electrically connected in series and/or parallel to provide an increased voltage and/or current-carrying capacity. In a non-limiting example, the plurality of battery cells is housed in an enclosure configured to protect the plurality of battery cells from mechanical vibration, water intrusion, and dust intrusion. The enclosure is also configured to provide temperature regulation (e.g., using a liquid cooling system, a resistive heating system, and/or the like). In an exemplary embodiment, the traction battery 30 further includes a battery management system (BMS) configured to monitor battery characteristics such as a state of charge (SOC), state of health (SOH), temperature, and/or the like, and transmit the battery characteristics to the controller 14. In a non-limiting example, the BMS includes a BMS controller in electrical communication with a plurality of BMS sensors disposed within the enclosure of the traction battery 30. In an exemplary embodiment, the traction battery 30 provides a DC voltage across a positive and negative output terminal. The positive and negative output terminals are electrically connected to the inverter 32 as will be discussed in greater detail below.

The inverter 32 is used to convert the direct current (DC) provided by the traction battery 30 to three-phase alternating current (AC) for use by the electric motor 34. In an exemplary embodiment, the inverter 32 includes a plurality of power semiconductor devices, such as, for example, insulated-gate bipolar transistors (IGBTs), metal-oxide semiconductor field-effect transistors (MOSFETs), and/or the like configured to convert DC to three-phase AC. In a non-limiting example, the inverter 32 functions by switching the plurality of power semiconductor devices in a pattern to generate an AC sinusoidal output for each of the three phases. The pattern may be adjusted to vary an amplitude, frequency, and/or relative phase shift of each of the three phases in order to control speed, direction, and/or torque of the electric motor 34 based on signals from the controller 14. Two DC input terminals of the inverter 32 are electrically connected to the traction battery 30, and three AC output terminals of the inverter 32 are electrically connected to the electric motor 34. The inverter 32 is in electrical communication with the controller 14, such that the controller 14 may enable, disable, and otherwise adjust the operation of the inverter 32.

The electric motor 34 is used to convert electrical energy from the traction battery 30 to mechanical energy (i.e., rotational energy) to propel the vehicle 12. In an exemplary embodiment, the electric motor 34 is a three-phase AC induction motor. In a non-limiting example, the electric motor 34 includes a stator having a plurality of stator windings and a rotor disposed rotatably within the stator having a plurality of rotor windings. The stator windings are excited by the three-phase AC provided by the inverter 32 to produce a rotating stator magnetic field. The rotating stator magnetic field induces currents in the rotor windings, which in turn produces a rotor magnetic field which interacts with the rotating stator magnetic field causing the rotor to rotate. The amplitude, frequency, and/or relative phase shift of the excitation of each of the three phases of the stator windings controls speed, direction, and/or torque of the electric motor 34. The three AC output terminals of the inverter 32 are electrically connected to three AC terminals of the electric motor 34.

It should be understood that in some embodiments, the vehicle propulsion system 22 may include a plurality of electric motors, each of the plurality of electric motors energized by one of a plurality of inverters. Each of the plurality of inverters may be separately controlled by the controller 14. It should also be understood that the description of the vehicle propulsion system 22 provided above is non-limiting. The vehicle propulsion system 22 may include various additional elements such as contactors, fuses, battery charging systems, DC/DC converters, transmissions, and/or other systems configured to monitor, maintain, communicate with, control, or otherwise facilitate the operation of the vehicle propulsion system 22 without departing from the scope of the present disclosure.

Certain aspects of the operation of the vehicle propulsion system 22 are determined by a plurality of propulsion calibration values. In the scope of the present disclosure, a propulsion calibration value is a predetermined value which affects an operation of the vehicle propulsion system 22, such as, for example, an inverter switching frequency (i.e., a frequency at which the plurality of power semiconductor devices of the inverter 32 are switched), an inverter enablement state (i.e., whether or not the inverter 32 is enabled), a motor no-fly zone (i.e., a torque and/or speed range within which the electric motor 34 is not operated), a spark table (i.e., spark ignition timings for an internal combustion engine), cylinder deactivation settings, transmission shift points, and the like. The controller 14 uses the propulsion calibration values to adjust and/or control the operation of the vehicle propulsion system 22. Propulsion calibration values may be represented as a single value or as a multidimensional lookup table (LUT), depending on the number of external variables which affect a given propulsion calibration value. For example, the inverter switching frequency may be a single constant value chosen to reduce electrical and acoustic switching noise. In another example, a spark table may be represented as a multidimensional LUT, because spark timings may be dependent on other factors, such as engine rotational speed (i.e., revolutions per minute) and/or throttle position. In an exemplary embodiment, the propulsion calibration values are stored in the media 26 of the controller 14.

In an exemplary embodiment, each of the plurality of propulsion calibration values has a plurality of operational profiles which are activated based on predetermined conditions. For example, a default transmission shift point LUT may be optimized for reduced cabin noise. However, when cabin noise is elevated due to other external factors, it may be advantageous to operate the transmission with an alternative transmission shift point LUT for increased efficiency and/or performance. In the scope of the present disclosure, an operational profile is a propulsion calibration LUT or propulsion calibration value configured to be used at a given cabin noise level. Each of the plurality of operational profiles of each of the plurality of propulsion calibration values has an associated predetermined noise level. For each of the plurality of propulsion calibration values, one of the plurality of operational profiles is applied at any given time based at least in part on a cabin noise level and the predetermined noise level associated with each of the plurality of operational profiles, as will be discussed in greater detail below in reference to the method 100.

Figure 2:
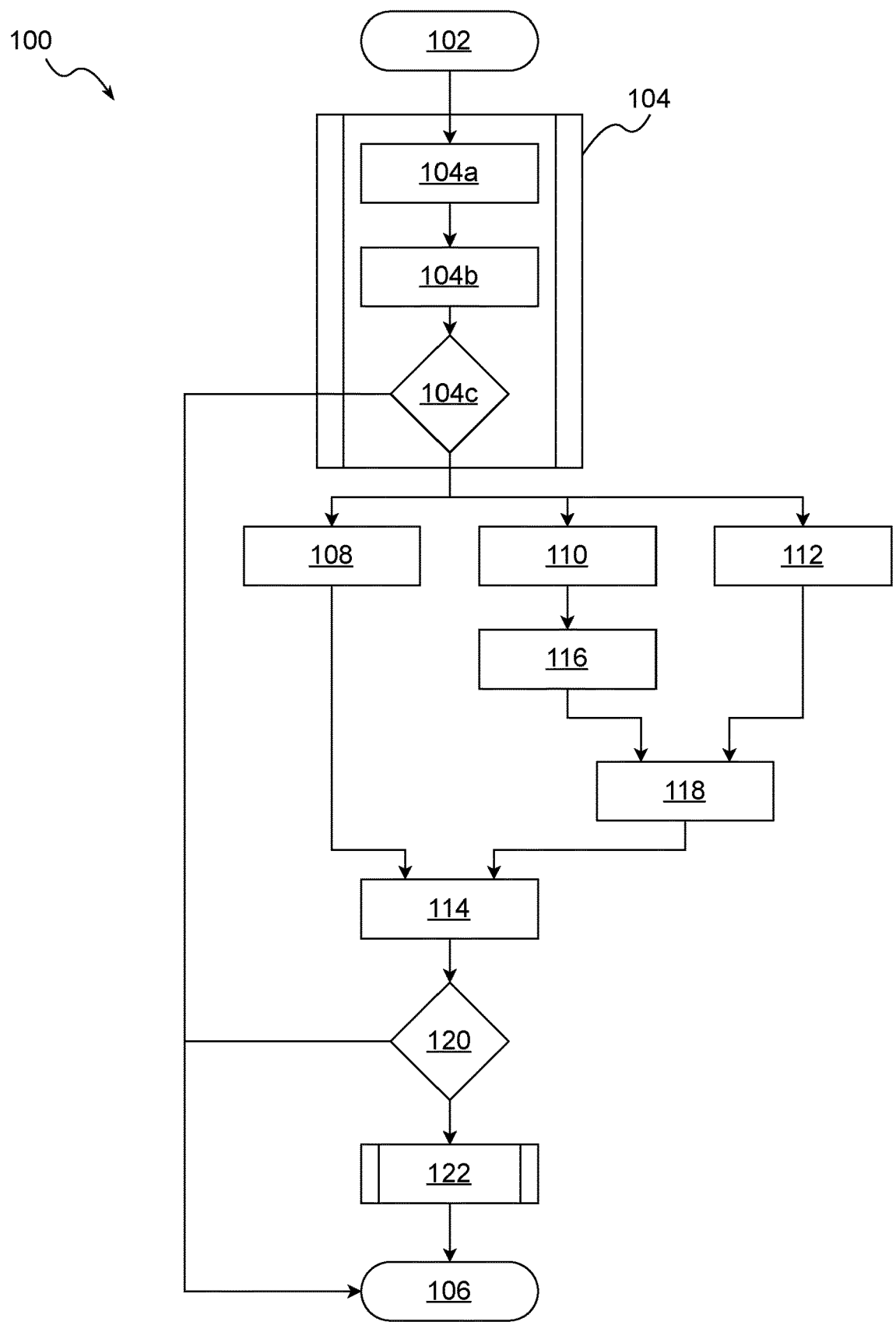
FIG. 2 is a flowchart of a method for propulsion control for a vehicle, according to an exemplary embodiment.

Referring to FIG. 2, a flowchart of the method 100 for propulsion control for a vehicle is shown. The method 100 begins at block 102 and proceeds to block 104. At block 104, the controller 14 performs a diagnostic check on the audio microphone 16. In an exemplary embodiment, the diagnostic check at block 104 includes multiple additional steps performed at blocks 104a, 104b, and 104c. At block 104a, the controller 14 uses the loudspeaker 20 to play a predetermined sound (e.g., multiple different tones played in a predetermined sequence) within the cabin of the vehicle 12. After block 104a, the diagnostic check proceeds to block 104b. At block 104b, the controller 14 records a received sound using the audio microphone 16. The received sound is a recording of the predetermined sound played at block 104a as received by the audio microphone 16. After block 104b, the diagnostic check proceeds to block 104c.

At block 104c, the predetermined sound played at block 104a is compared to the received sound recorded at block 104c. In an exemplary embodiment, a waveform of the predetermined sound is compared to a waveform of the received sound to determine a deviation. In another exemplary embodiment, additional processing, such as, for example, a fast Fourier transform (FFT) is used to process both the predetermined sound and the received sound. The results of the FFT of the predetermined sound are then compared to the results of the FFT of the received sound to determine a deviation. If the deviation is greater than a predetermined deviation threshold (e.g., ten percent), the diagnostic check is considered to have failed, and the method 100 proceeds to enter a standby state at block 106. Additionally, if the vehicle propulsion system 22 is determined to be inactive or the vehicle 12 is determined to be in an emissions testing scenario (e.g., a dynamometer mode is true), the method 100 proceeds to enter the standby state at block 106. If the deviation is less than or equal to the predetermined deviation threshold, the diagnostic check is considered to have succeeded, and the method 100 proceeds to blocks 108, 110, and 112.

In some embodiments, the diagnostic check of block 104 as described above is only performed periodically, and not upon every execution of the method 100 (e.g., only upon initial startup of the vehicle 12). For subsequent executions of the method 100, a reduced diagnostic check may be performed. In a non-limiting example, to perform the reduced diagnostic check, the controller 14 checks an electrical continuity and/or resistance of an electrical connection between the controller 14 and the audio microphone 16. If one or both of the electrical continuity and resistance are outside of a predetermined diagnostic threshold, the diagnostic check is considered to have failed, and the method 100 proceeds to enter a standby state at block 106. Otherwise, the diagnostic check is considered to have succeeded, and the method 100 proceeds to blocks 108, 110, and 112.

At block 108, the controller 14 measures a closed-loop noise level using the audio microphone 16. In the scope of the present disclosure, the term "closed-loop" refers to the fact that the closed-loop noise level is a direct measurement of the noise level in the cabin of the vehicle 12 using the audio microphone 16. In an exemplary embodiment, the noise level is measured in decibels and saved in the media 26 of the controller 14 for further processing, as will be discussed in greater detail below. In another exemplary embodiment, the controller 14 performs further processing steps to estimate the closed-loop noise level specifically at a location of an occupant of the vehicle 12 within the cabin of the vehicle 12. After block 108, the method 100 proceeds to block 114, as will be discussed in greater detail below.

At block 110, the controller 14 determines a vehicle speed using the vehicle speed sensor 18. In an exemplary embodiment, the controller 14 electrically communicates with the vehicle speed sensor 18 to command the vehicle speed sensor 18 to provide a signal to the controller 14 indicating the current vehicle speed. In another exemplary embodiment, the controller 14 process signals received from the vehicle speed sensor 18 to determine the current vehicle speed. After block 110, the method 100 proceeds to block 116.

At block 116, the controller 14 determines an estimated road and wind noise level. In an exemplary embodiment, the estimated road and wind noise level is based at least in part on the vehicle speed determined at block 110. In a non-limiting example, the media 26 of the controller 14 contains at least one known road and wind noise level measured at a known speed. In an exemplary embodiment, during a testing process, the vehicle 12 is driven at a predetermined speed (the known speed) and the audio microphone 16 is used to measure the known road and wind noise level. The known road and wind noise level at the corresponding known speed are subsequently saved in the media 26 of the controller 14. Using the known road and wind noise level at the known speed, an assumption that the road and wind noise level is zero at a speed of zero, and an assumption that a known mathematical relation (e.g., linear, exponential, logarithmic, etc.) relates the vehicle speed and the road and wind noise level, the estimated road and wind noise level is determined based on the vehicle speed determined at block 110 using interpolation or extrapolation. After block 116, the method 100 proceeds to block 118, as will be discussed in greater detail below.

At block 112, the controller 14 determines a vehicle audio volume level within the cabin of the vehicle 12. In some examples, the loudspeaker 20 may be used by an infotainment system (not shown) of the vehicle 12 to play audio for entertainment purposes (e.g., music), increasing the noise level in the cabin of the vehicle 12. In an exemplary embodiment, to determine the vehicle audio volume level, the controller 14 electrically communicates with the loudspeaker 20 and/or the infotainment system (not shown) of the vehicle 12 to determine the vehicle audio volume level. After block 112, the method 100 proceeds to block 118.

At block 118, the controller 14 determines an open-loop noise level. In the scope of the present disclosure, the term "open-loop" refers to the fact that the open-loop noise level is a mathematical estimation of the noise level in cabin in the vehicle 12 which is not based on measurements from the audio microphone 16. In an exemplary embodiment, the open-loop noise level is determined to be a combination of the estimated road and wind noise level determined at block 116 and the vehicle audio volume level determined at block 112. In a non-limiting example, because decibels are a logarithmic unit, the estimated road and wind noise level is combined with the vehicle audio volume level by summing an intensity of the estimated road and wind noise level with an intensity of the vehicle audio volume level. Intensity may be determined from decibel level based on the reference intensity of the logarithmic decibel scale (e.g., one picowatt per square meter). It should be understood that various additional noise sources (e.g., weather data, windscreen wiper activation state, road surface data, and/or the like) may be accounted for in the determination of the open-loop noise level without departing from the scope of the present disclosure. After block 118, the method 100 proceeds to block 114.

At block 114, the controller 14 determines a deviation between the closed-loop noise level determined at block 108 and the open-loop noise level determined at block 118. In an exemplary embodiment, the deviation is determined to be a difference between the closed-loop noise level and the open-loop noise level at one point in time. In another exemplary embodiment, the deviation is determined based on a plurality of historical differences between the closed-loop noise level and the open-loop noise level. It should be understood that various additional methods of determining the deviation between the closed-loop noise level and the open-loop noise level are within the scope of the present disclosure. After block 114, the method 100 proceeds to block 120.

At block 120, the controller 14 compares the deviation determined at block 114 to a predetermined deviation threshold. In an exemplary embodiment, the predetermined deviation threshold is a percent deviation (e.g., ten percent). In another exemplary embodiment, the predetermined deviation threshold is an absolute deviation (e.g., 3 decibels). In yet another exemplary embodiment, the predetermined deviation threshold describes a total deviation accumulated over a predetermined time period (e.g., ten seconds). If the deviation is greater than the predetermined deviation threshold, the closed-loop noise level is considered to be invalid, and the method 100 proceeds to enter the standby state at block 106. If the deviation is less than or equal to the predetermined deviation threshold, the method 100 proceeds to block 122.

At block 122, the controller 14 adjusts a propulsion calibration value of the vehicle propulsion system 22 based on the closed-loop noise level, as will be discussed in greater detail in reference to FIG. 3 below. After block 122, the method 100 proceeds to enter the standby state at block 106. In an exemplary embodiment, the controller 14 repeatedly exits the standby state 106 and restarts the method 100 at block 102. In a non-limiting example, the controller 14 exits the standby state 106 and restarts the method 100 on a timer, for example, every three hundred milliseconds.

Figure 3:
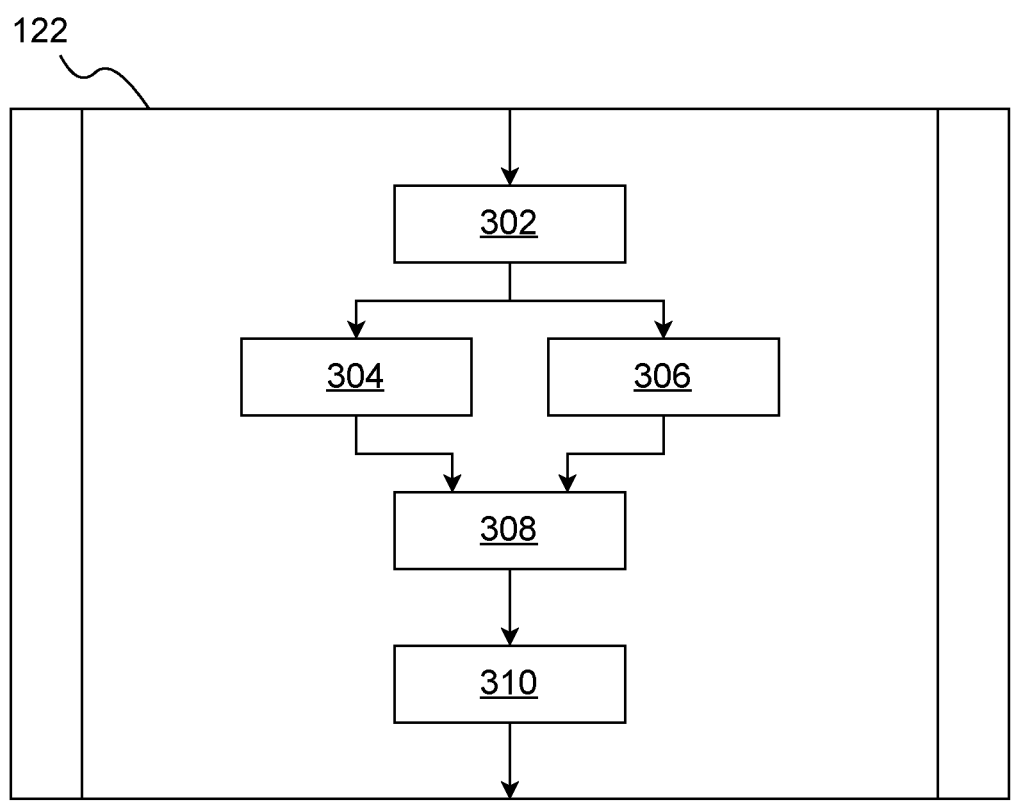
FIG. 3 is a flowchart of a method for adjusting a propulsion calibration value, according to an exemplary embodiment.

Referring to FIG. 3, a flowchart of an exemplary embodiment of block 122 is shown. The exemplary embodiment of block 122 begins at block 302. At block 302, the controller 14 compares the closed-loop noise level to a predetermined noise level of each of the plurality of operational profiles of the propulsion calibration value. As discussed above, the propulsion calibration value has a plurality of operational profiles, each of the plurality of operational profiles having a predetermined noise level. After block 302, the exemplary embodiment of block 122 proceeds to blocks 304 and 306.

At block 304, the controller 14 identifies a first of the plurality of operational profiles of the propulsion calibration value having a predetermined noise level less than the closed-loop noise level determined at block 108 based on the comparison performed at block 302. After block 304, the exemplary embodiment of block 122 proceeds to block 308, as will be discussed in greater detail below.

At block 306, the controller 14 identifies a second of the plurality of operational profiles of the propulsion calibration value having a predetermined noise level greater than the closed-loop noise level determined at block 108 based on the comparison performed at block 302. After block 306, the exemplary embodiment of block 122 proceeds to block 308.

At block 308, the controller 14 generates a selected operational profile. In an exemplary embodiment, to generate the selected operational profile, the controller 14 interpolates between the first of the plurality of operational profiles identified at block 304 and the second of the plurality of operational profiles identified at block 306. For example, if the closed-loop noise level is 30 decibels, the predetermined noise level of the first of the plurality of operational profiles is 25 decibels, the propulsion calibration value of the first of the plurality of operational profiles is 10 units, the predetermined noise level of the second of the plurality of operational profiles is 35 decibels, and the propulsion calibration value of the second of the plurality of operational profiles is 20 units, the selected operational profile has a propulsion calibration value of 15 units.

In some embodiments, rather than interpolating between the first and the second of the plurality of operational profiles, the controller 14 identifies one of the first and the second of the plurality of operational profiles having a closest predetermined noise level to the closed-loop noise level, and selects the one of the first and the second of the plurality of operational profiles having the closest predetermined noise level to the closed-loop noise level as the selected operational profile. After block 308, the exemplary embodiment of block 122 proceeds to block 310.

At block 310, the controller 14 applies the selected operational profile generated at block 308. In the scope of the present disclosure, applying an operational profile means that the operational profile is used by the controller 14 to control the vehicle propulsion system 22. Continuing with aforementioned example, assume that the propulsion calibration value is the inverter switching frequency, and that the units are hertz. Therefore, to apply the selected operational profile, the controller 14 electrically communicates with the inverter 32 to command the inverter 32 to operate with a switching frequency of 15 hertz. After block 310, the exemplary embodiment of block 122 is concluded and the method 100 proceeds as described above.

The system 10 and method 100 of the present disclosure offer several advantages. Propulsion calibration values may typically be optimized to promote occupant comfort by reducing ambient cabin noise. With the system 10 and method 100 of the present disclosure, when ambient cabin noise levels are already high due to external factors, operational profiles may be chosen which optimize fuel/energy efficiency, performance, reduced vehicle wear, and/or the like. Therefore, by using the system 10 and method 100 of the present disclosure, vehicle resource use may be optimized, and efficiency increased.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A propulsion control system for a vehicle, the propulsion control system comprising:
   a first vehicle sensor;
   a second vehicle sensor;
   a controller in electrical communication with the first vehicle sensor and the second vehicle sensor, wherein the controller is programmed to:
      determine a closed-loop noise level in a cabin of the vehicle using the first vehicle sensor;
      determine an open-loop noise level in the cabin of the vehicle using the second vehicle sensor;
      determine a deviation between the closed-loop noise level and the open-loop noise level;
      compare the deviation to a predetermined deviation threshold; and
      adjust a propulsion calibration value of the vehicle based at least in part on the closed-loop noise level in response to determining that the deviation is less than or equal to the predetermined deviation threshold.

2. The propulsion control system of claim 1, wherein to determine the closed-loop noise level, the controller is further programmed to:
   measure the closed-loop noise level using the first vehicle sensor, wherein the first vehicle sensor is an audio microphone disposed within the cabin of the vehicle.

3. The propulsion control system of claim 2, wherein to determine the closed-loop noise level, the controller is further programmed to:
   perform a diagnostic check on the audio microphone prior to measuring the closed-loop noise level.

4. The propulsion control system of claim 3, wherein to perform the diagnostic check on the audio microphone, the controller is further programmed to:
   play a predetermined sound using a loudspeaker;
   record a received sound using the audio microphone; and
   compare the received sound to the predetermined sound.

5. The propulsion control system of claim 1, wherein to determine the open-loop noise level, the controller is further programmed to:
   determine a vehicle speed using the second vehicle sensor, wherein the second vehicle sensor is a vehicle speed sensor;
   determine a vehicle audio volume level; and
   determine the open-loop noise level based at least in part on the vehicle speed and the vehicle audio volume level.

6. The propulsion control system of claim 5, wherein to determine the open-loop noise level based at least in part on the vehicle speed and the vehicle audio volume level, the controller is further programmed to:
   determine an estimated road and wind noise level based at least in part on the vehicle speed, wherein the estimated road and wind noise level is determined based at least in part on at least one known road and wind noise level measured at a known speed; and
   determine the open-loop noise level to be a combination of the vehicle audio volume level and the estimated road and wind noise level.

7. The propulsion control system of claim 1, wherein to adjust the propulsion calibration value of the vehicle based on the closed-loop noise level, the controller is further programmed to:
   compare the closed-loop noise level to a predetermined noise level of each of a plurality of operational profiles of the propulsion calibration value; and
   apply one of the plurality of operational profiles of the propulsion calibration value having the predetermined noise level closest to the closed-loop noise level.

8. The propulsion control system of claim 7, wherein to adjust the propulsion calibration value of the vehicle based on the closed-loop noise level, the controller is further programmed to:
   identify a first of the plurality of operational profiles of the propulsion calibration value having the predetermined noise level less than the closed-loop noise level;
   identify a second of the plurality of operational profiles of the propulsion calibration value having the predetermined noise level greater than the closed-loop noise level;
   generate a selected operational profile by interpolating between the first of the plurality of operational profiles of the propulsion calibration value and the second of the plurality of operational profiles of the propulsion calibration value based on the closed-loop noise level; and
   apply the selected operational profile.

9. The propulsion control system of claim 1, wherein the propulsion calibration value includes at least one of an inverter switching frequency, an inverter enablement state, and a motor no-fly zone.

10. A method for propulsion control for a vehicle, the method comprising:
    determining a closed-loop noise level in a cabin of the vehicle using a first vehicle sensor;
    determining an open-loop noise level in the cabin of the vehicle using a second vehicle sensor;
    determining a deviation between the closed-loop noise level and the open-loop noise level;
    comparing the deviation to a predetermined deviation threshold; and
    adjusting a propulsion calibration value of the vehicle based at least in part on the closed-loop noise level in response to determining that the deviation is less than or equal to the predetermined deviation threshold.

11. The method of claim 10, wherein determining the closed-loop noise level further comprises:
    measuring the closed-loop noise level using the first vehicle sensor, wherein the first vehicle sensor is an audio microphone disposed within the cabin of the vehicle.

12. The method of claim 10, wherein determining the open-loop noise level further comprises:
    determining a vehicle speed using the second vehicle sensor, wherein the second vehicle sensor is a vehicle speed sensor;
    determining a vehicle audio volume level; and
    determining the open-loop noise level based at least in part on the vehicle speed and the vehicle audio volume level.

13. The method of claim 12, wherein determining the open-loop noise level based at least in part on the vehicle speed and the vehicle audio volume level further comprises:
    determining an estimated road and wind noise level based at least in part on the vehicle speed, wherein the estimated road and wind noise level is determined based at least in part on at least one known road and wind noise level measured at a known speed; and determining the open-loop noise level to be a combination of the vehicle audio volume level and the estimated road and wind noise level.

14. The method of claim 10, wherein adjusting the propulsion calibration value of the vehicle based on the closed-loop noise level further comprises:

comparing the closed-loop noise level to a predetermined noise level of each of a plurality of operational profiles of the propulsion calibration value; and applying one of the plurality of operational profiles of the propulsion calibration value having the predetermined noise level closest to the closed-loop noise level.

15. The method of claim 14, wherein adjusting the propulsion calibration value of the vehicle based on the closed-loop noise level further comprises:

identifying a first of the plurality of operational profiles of the propulsion calibration value having the predetermined noise level less than the closed-loop noise level;

identifying a second of the plurality of operational profiles of the propulsion calibration value having the predetermined noise level greater than the closed-loop noise level;

generating a selected operational profile by interpolating between the first of the plurality of operational profiles of the propulsion calibration value and the second of the plurality of operational profiles of the propulsion calibration value based on the closed-loop noise level; and applying the selected operational profile.

16. A propulsion control system for a vehicle, the propulsion control system comprising:

an audio microphone;

a vehicle speed sensor;

a controller in electrical communication with the audio microphone and the vehicle speed sensor, wherein the controller is programmed to:

perform a diagnostic check on the audio microphone;

measure a closed-loop noise level using the audio microphone;

determine a vehicle speed using the vehicle speed sensor;

determine a vehicle audio volume level;

determine an open-loop noise level based at least in part on the vehicle speed and the vehicle audio volume level;

determine a deviation between the closed-loop noise level and the open-loop noise level;

compare the deviation to a predetermined deviation threshold; and adjust a propulsion calibration value of the vehicle based on the closed-loop noise level in response to determining that the deviation is less than or equal to the predetermined deviation threshold.

17. The propulsion control system of claim 16, wherein to determine the open-loop noise level based at least in part on the vehicle speed and the vehicle audio volume level, the controller is further programmed to:

determine an estimated road and wind noise level based at least in part on the vehicle speed, wherein the estimated road and wind noise level is determined based at least in part on at least one known road and wind noise level measured at a known speed; and determine the open-loop noise level to be a combination of the vehicle audio volume level and the estimated road and wind noise level.

18. The propulsion control system of claim 17, wherein to adjust the propulsion calibration value of the vehicle based on the closed-loop noise level, the controller is further programmed to:

compare the closed-loop noise level to a predetermined noise level of each of a plurality of operational profiles of the propulsion calibration value; and apply one of the plurality of operational profiles of the propulsion calibration value having the predetermined noise level closest to the closed-loop noise level.

* * * * *